United States Patent [19]
Dent

[11] Patent Number: 5,812,544
[45] Date of Patent: Sep. 22, 1998

[54] DUAL MODE PORTABLE TELEPHONE UNIT

[75] Inventor: Paul W. Dent, Pittsboro, N.C.

[73] Assignee: Ericsson Inc., Research Triangle Park, N.C.

[21] Appl. No.: 725,577

[22] Filed: Oct. 3, 1996

[51] Int. Cl.⁶ .................................................. H04B 7/212
[52] U.S. Cl. .......................... 370/337; 370/347; 379/58
[58] Field of Search .................................. 370/280, 337, 370/347, 350, 442, 498, 521, 465, 468, 458; 379/58, 60, 59

[56] References Cited

U.S. PATENT DOCUMENTS

| 5,222,104 | 6/1993 | Medendorp | 375/308 |
|---|---|---|---|
| 5,260,944 | 11/1993 | Tomabechi | 370/347 |
| 5,363,373 | 11/1994 | Nakahara et al. | 370/314 |
| 5,444,696 | 8/1995 | Petranovich | 370/337 |
| 5,509,014 | 4/1996 | Utting | 370/337 |
| 5,541,979 | 7/1996 | Leslie et al. | 379/60 |
| 5,561,846 | 10/1996 | Hagio | 455/34.1 |
| 5,615,215 | 3/1997 | Utting et al. | 370/337 |
| 5,642,355 | 6/1997 | Smith | 370/337 |
| 5,668,804 | 9/1997 | Suonvieri | 370/331 |

*Primary Examiner*—Hassan Kizou
*Assistant Examiner*—A. Bnimoussa
*Attorney, Agent, or Firm*—Jenkens & Gilchrist, P.C.

[57] ABSTRACT

A method and apparatus enabling operation of a dual mode TDMA portable telephone unit is disclosed. The first mode of operation enables synchronous communication up to 75 kilometers. In the second mode of operation, the portable telephone unit operates according to a frame structure enabling synchronization between the portable telephone unit and the base station for ranges greater than 75 kilometers. This increased range is achieved by moving the transmission timeslot within the frame structure of a TDMA transmission in the second mode to a later timeslot then in the frame structure of the first mode.

14 Claims, 4 Drawing Sheets

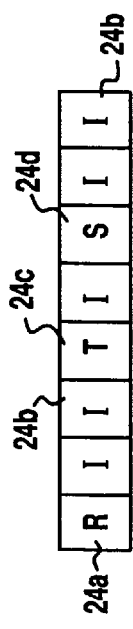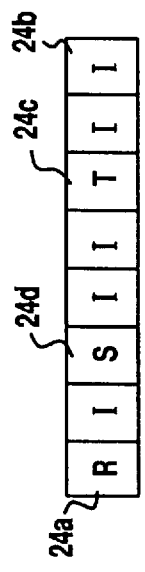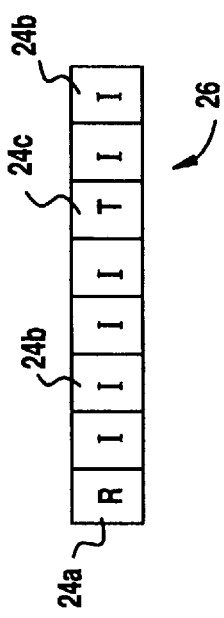

DUAL MODE PORTABLE TELEPHONE UNIT

BACKGROUND OF THE INVENTION

1. Technical Field of the Invention

The present invention relates to cellular radio telephone systems, and more particularly, to a portable telephone unit having dual mode TDMA standards enabling operation with long-range or normal range base stations.

2. Description of Related Art

Time duplex portable telephone units are configured to perform TDMA functionalities within a particular range normally about 75 km. However, the use of portable telephone units within so called "megacells" (range from base station greater than 75 km) can cause time synchronization problems with the base station when the portable units attempt to operate using the same standard as apply to stations at normal ranges. Time synchronization problems are caused by the greater time delays inherent in contacting a base station over long distances.

Existing TDMA systems must have their transmitted signal received by the base station during a particular time period. Long range transmissions between base stations and portable telephone units in megacells prevent the reception of transmitted signals at the proper time by the base station. Thus, portable telephone units able to operate over both normal and long-range distances, such as when airborne platforms or satellites are used, would greatly benefit users and providers of cellular telephone systems.

SUMMARY OF THE INVENTION

The present invention overcomes the foregoing and other problems with a TDMA portable telephone unit capable of dual mode operation. The portable telephone unit includes means for switching between first and second modes of operation enabling normal and extended range transmissions between the portable unit and a base station. When the first or normal range mode of operation is selected the portable telephone unit is operated according to a first TDMA operation sequence. The first sequence includes a plurality of timeslots enabling communications within a range of approximately 75 km while maintaining a proper timing relationship between signals received from multiple portable telephone units at the base station. Upon selection of the second or extended mode of operation, the portable telephone unit operates in accordance with a second TDMA frame structure or operation sequence. The second frame structure or sequence includes a plurality of timeslots enabling synchronized communications with a base station within a second extended range that is greater than the range of the normal range mode of operation, such as when operation to a base station located on an airborne platform or via a satellite is desired.

The ability of the portable telephone unit to carry out synchronized communications within the greater range is achieved by utilizing a frame structure or sequence of operation having the transmission timeslot nominally occurring later within the frame relative to the receive slot, than when using the first frame structure or sequence. This enables the transmission timeslot to be advanced further from the nominal position in order to compensate for a greater loop propagation delay caused by greater distances between the portable telephone unit and the base station.

BRIEF DESCRIPTION OF THE DRAWINGS

A more complete understanding of the method and apparatus of the present invention may be obtained by reference to the following Detailed Description when taken in conjunction with the accompanying Drawings wherein:

FIGS. 3a, 3b and 3c illustrate the normal and extended range frame structures utilized by a dual-mode portable telephone unit.

DETAILED DESCRIPTION OF THE DRAWINGS

Figure 1:
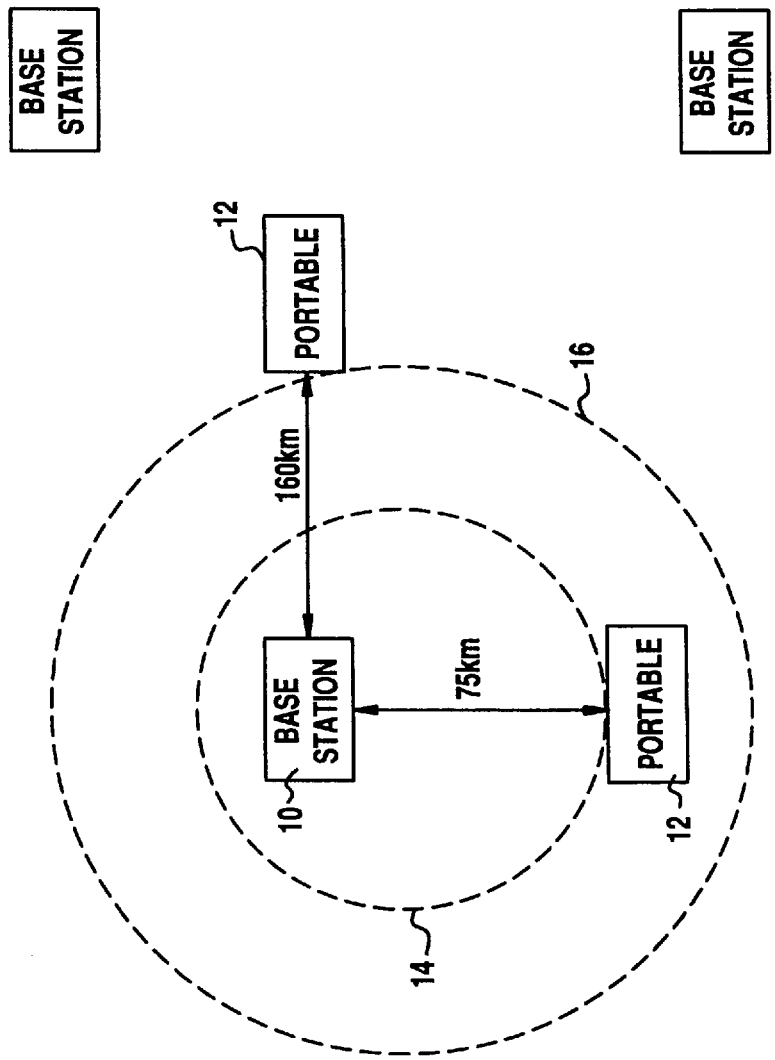
FIG. 1 illustrates the dual coverage areas possible using a dual mode portable telephone unit.

Referring now to the drawings, and more particularly to FIG. 1, there is illustrated a system having a dual-mode portable telephone unit 12 and a base station 10. The portable units 12 are capable of operating in one of two modes enabling operation within both a 75 kilometer range of the base station, shown generally at 14, or within a 160 kilometer range (for example) of the base station 10, shown generally at 16. While FIG. 1 illustrates the use of a base station 10 having an omnidirectional antenna, the system is equally applicable to base stations using sectorized antennas. Furthermore, the first and second operating ranges may be of any distance.

The long ranges (greater than 75 km) involved with the megacell base stations or satellite communications cause synchronization problems when using standard time duplex portable telephones. These problems arise from the limited window in which a transmission (T) timeslot may be advanced in order to achieve proper synchronization with the base station 10. Portable phones operating within normal ranges are able to transmit data to the base station such that the data is received within a pre-specified timeslot. However, when ranges of greater than 75 kilometers are attempted synchronization of the transmission by the portable unit and the reception of the base station is not possible, as this would require the transmit timeslot to be advanced into the receive timeslot. In a time-duplex apparatus this is not allowed as the apparatus cannot transmit and receive in overlapping periods.

Figure 2:
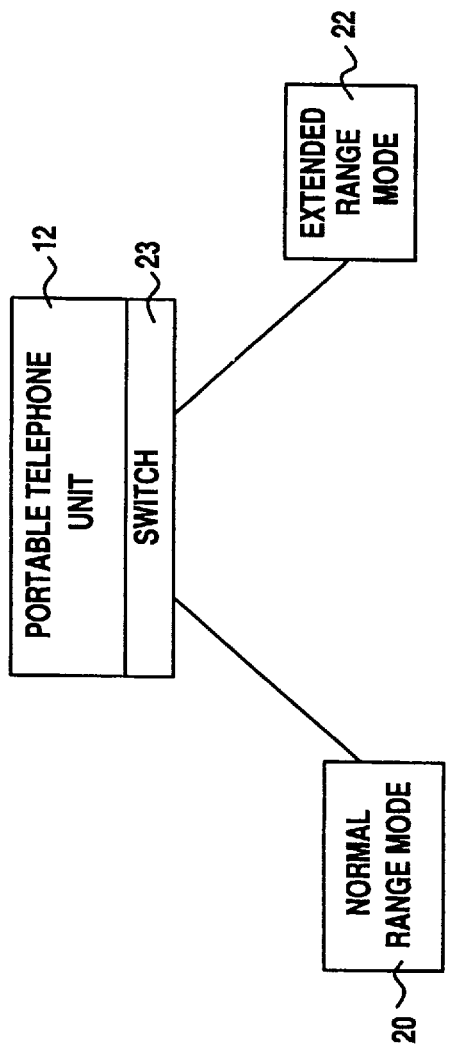
FIG. 2 is a general block diagram of a dual-mode portable telephone unit.

A solution to this problem, as shown in FIG. 2, utilizes a portable telephone unit 12 incorporating a normal range mode of operation 20 for TDMA transmissions within normal size cells and an extended range mode of operation 22 for use with megacells having ranges between the base station and the portable unit of up to at least 160 kilometers. A switch 23 enables conversions between these two modes. According to one aspect of the invention, the second or long range mode can even include use of a longer TDMA frame period.

In the normal mode of operation 20, the telephone operates, for example, according to the published standard for the global system for mobile communications (GSM), having a frame period of approximately 4.6 ms. As shown in FIG. 3a, the eight timeslots in a GSM frame are designated, R (receive), I (idle), T(transmit), and S (scan). In the extended range mode, the portable telephone unit 12 receives signals in the receive timeslots 24a of a TDMA time frame 26. The next one or two timeslot 24b following a received timeslot 24a are idle as the portable unit 12 changes from the receiving state to the transmission state. The portable unit 12 transmits a signal to the base station 10 within the transmission timeslot 24c.

After transmission, during the approximately four remaining timeslots, the portable telephone unit 12 changes frequencies to scan the signal strength on one of a number of neighboring base station frequencies. The telephone unit 12 then changes back to its own receive frequency to receive the next burst of traffic information from the next time frame. This procedure provides a repeating time frame structure of the form RIITISII RIITISII . . . for the cellular signal.

The GSM specification enables a base station 10 to command the portable telephone unit 12 to advance its timing by a limited amount in order to account for loop propagation delays during transmission such that transmissions will be received by the base station during the correct timeslot and not overlap other transmissions in adjacent timeslots. However, the transmission range is limited since the portable telephone unit 12 cannot advance its transmission time to occur soon after or simultaneously with the receive timeslot 24a. Therefore, the most the transmission slot can be advanced is about one timeslot or idle period or approximately 500 microseconds, resulting for example in the sequence RITIISII . . . . This allows transmissions out to a range of approximately 75 kilometers.

By switching to the extended range mode of operation 22 (FIG. 2), the portable telephone unit 12 switches to an altered frame structure or operation sequence as illustrated in FIGS. 3b or 3c. In the altered frame structure, switching to scanning (S) to measure signal strength of adjacent base stations does not always occur after transmission and before reception as occurs in normal frame structures. Scanning (S) instead takes place after reception (R) and before transmission (T) or not at all. This procedure generates a repeating sequence of operation of the form RISIITII RISIITII . . . (when scanning is performed) or RIIIITII RIIIITII . . . (when no scanning is performed).

Thus, the transmit timeslot 24c may be located up to two or three slots later than in standard GSM frame format. By locating the transmission timeslot nominally later within the frame structure, the transmit timeslot (T) may be advanced by up to two timeslots or 1.1 milliseconds from its nominal position to compensate for greater loop delay. This provides up to 1.1 milliseconds time advance capability enabling synchronization with base stations up to 160 kilometers distance. When the time advance brings the transmit timeslot nearer the preceding receive slot than the following receive slot, the position of the scan operation is changed to be after the transmit slot where more idle time is available. Thus, the inventive apparatus is able to alter its sequence of operation from (Receive, Transmit, Scan) to (Receive, Scan, Transmit) in a dynamic fashion in dependence on the required time advance of the transmit slot.

When communication over ranges of much greater than the exemplary 160 km mentioned above is desired, as may occur when communicating via orbiting satellites, further measures to enhance the range of adjustment for timing advance in the long range mode can include lengthening the TDMA frame period. For example, the frame period can appropriately be lengthened to 16 slots or even 32 slots in a satellite mode while maintaining the same slot format as GSM, thus more than doubling or quadrupling the range of advance of the transmit timeslot.

The range of advance required for successful satellite communications is not related to the total distance to the satellite, which may be as much as 40000 km, representing a loop delay of 270 ms, but rather is related to the variation in that distance as the portable unit roams within a given service area. The service area may be divided into cells by using multiple directional antenna beams, and the satellite system can adjust its nominal receive timing separately for the center of each cell; the portable unit then only needs to adjust its transmit timing advance in accordance with movement over the diameter of the cell which is of course much less than the distance from the center of the cell to the satellite. If necessary, the frame period for communications with the satellite can be increased to 40 ms for example.

Figure 4:
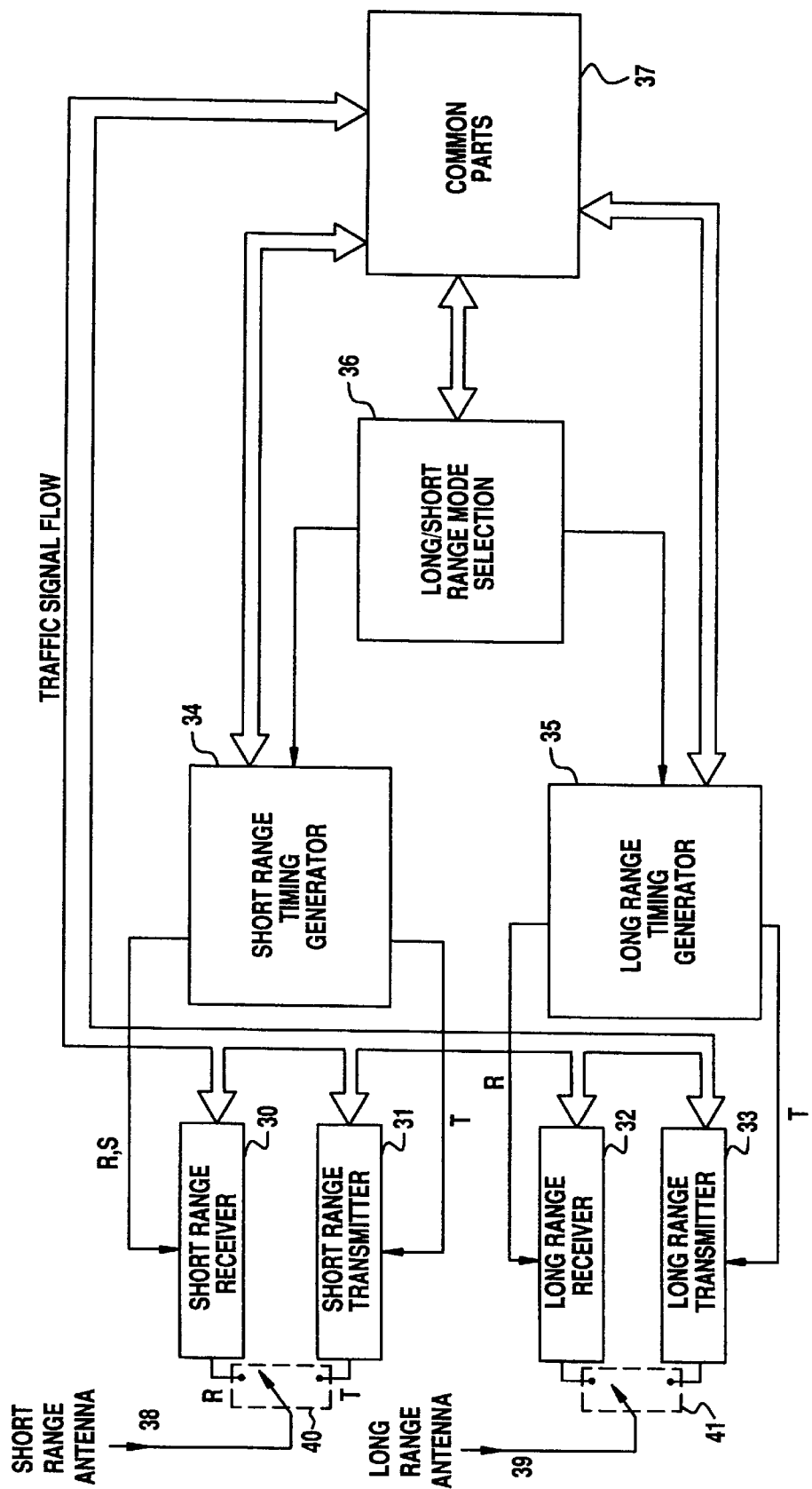
FIG. 4 is a block diagram of a short/long range portable telephone unit having two timing generators.

FIG. 4 illustrates a short/long range portable telephone unit having two timing generators to support different length frame periods. Different types of dual mode telephone units have been previously described, for example, in U.S. patent application Ser. No. 07/967,027; U.S. patent application Ser. No. 08/135,542; U.S. patent application Ser. No. 08/305,780; and U.S. patent application Ser. No. 08/501,575. Each of these commonly assigned applications are hereby incorporated herein by reference as background support for the other technical design aspects of dual mode phones. Commonly assigned U.S. patent application Ser. No. 08/354,904 discloses the timing issues for TDMA operation via orbiting satellites and is also incorporated herein by reference in its entirety. The above incorporated references do not specifically address the need for the use of two TDMA timing generators which may be invoked respectively for a long range mode or a short range mode of operation as illustrated in FIG. 4.

FIG. 4 illustrates the short-range timing generator 34 which may, for example, control a separate short-range transmitter 30, receiver 31 and antenna 30 combination to operate cyclically over a 4.6 mS frame period, and a long-range timing generator 35 which may control separate long-range transmitter 32, receiver 33 and antenna 39 combination to operate cyclically over a longer frame period, such as a multiple of two or four times the short range frame period of 4.6 mS, or alternatively, over a 20 mS or 40 mS frame period as used by the IS136 3/6-slot TDMA standard. The selection of the short-range or long-range mode is effected by selection logic 36 at the behest of a controller that may be a part of the common circuitry 37 for all modes. The common circuitry 37 can include digital signal processing to code information signals for transmission or decode received signals. The decision to switch between short-range and long-range modes can even be made automatically in dependence on the received signals from receiver 30 or 32 and controlled via a pair of switches 40, 41.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A dual-mode TDMA portable telephone unit, comprising:

means for operating the portable telephone unit according to a first operation sequence within a repetitive TDMA frame period in response to selection of a first mode of operation, the first operation sequence including selection of one of a plurality of time slots within a TDMA frame period for reception and selection of another time slot for transmission to enable communications within a first range while maintaining reception of the transmission time slot at a base station without overlapping other signals received by said base station;

means for operating the portable telephone unit according to a second operation sequence within a repetitive TDMA frame period in response to selection of a second mode of operation, the second sequence including selection of one of a plurality of time slots within a TDMA frame period for reception and selection of another time slot for transmission different than the transmission time slot selected in said first mode of operation to enable communications within a second range while maintaining reception of the transmission time slot at the base station without overlapping other signals received by the base station, the second sequence further enabling advancement of a transmission time slot up to two time slots from a nominal position of the transmission time slot; and means for switching between the first and the second modes of operation.

2. The portable telephone unit of claim 1 wherein the second sequence of operation enables advancement of a transmission timeslot by at least 1.1 milliseconds in order to maintain synchronization with the base station.

3. The portable telephone unit of claim 1 wherein the second sequence of operation, scans other base stations after reception of an incoming signal but prior to transmission of an outgoing signal.

4. The portable telephone unit of claim 1 wherein the second sequence of operation includes no timeslot for scanning frequencies of other base units.

5. The portable telephone unit of claim 1 wherein a transmission timeslot in said second sequence of operation occurs later relative to the preceding receive timeslot than a transmission timeslot of the first sequence of operation.

6. The portable telephone unit of claim 1 wherein the second operation sequence includes eight timeslots having a format RISIITIII where R denotes receive, I denotes idle, T denotes transmit and S denotes scanning another frequency.

7. The portable telephone unit of claim 1 wherein the second operation sequence includes eight timeslots having format RIIIITII, where R denotes receive, I denotes idle and T denotes transmit.

8. A TDMA portable telephone unit for communicating with base stations at a first range and a second range, comprising:

a first TDMA timing means for generating a first sequence of alternating transmit and receive operations over a first repetitive frame period;

a second TDMA timing means for generating a second sequence of alternating transmit and receive operations over a second repetitive frame period that is a multiple of said first frame period; and means for switching to said first TDMA timing means for communications to a base station within the first range and alternatively for switching to said second TDMA timing means for communications to a base station with the second range.

9. The telephone unit of claim 8 wherein said first repetitive frame period has a length of approximately 4.5 mS–4.8 mS and wherein said second frame period has a length equal to a multiple of 20 mS.

10. The telephone unit of claim 8 wherein said first sequence of alternating transmit and receive operations comprises RITS and said second sequence of alternating transmit and receive operations comprises RITI, wherein R denotes receive, I denotes idle, T denotes transmit and S denotes scanning another frequency channel.

11. The telephone unit of claim 8 wherein the base station comprises an orbiting satellite transponder.

12. The telephone unit of claim 8 wherein the base station comprises an airborne platform.

13. A method enabling dual mode operation of a TDMA portable telephone unit, comprising the steps of:

selecting between a first mode and a second mode of operation;

operating the portable telephone unit according to a first operation sequence within a repetitive TDMA frame period in response to selection of the first mode of operation, the first operation sequence enabling synchronous communication between the portable telephone unit and a base station within a first range while avoiding overlapping signals at the base station; and operating the portable telephone unit according to a second operation sequence within a repetitive TDMA structure in response to selection of the second mode of operation by advancing a transmission period forward up to two time slots from a nominal position in order to maintain synchronization between the portable telephone unit and the base station, the second operation sequence enabling synchronous communication between the portable telephone unit and a base station within a second range greater than the first range while avoiding overlapping signals at the base station.

14. The method of claim 13 wherein the step of operating the portable telephone unit according to a second operation sequence includes the step of advancing a transmission period by at least 1.1 milliseconds in order to maintain synchronization between the portable telephone unit and the base station.

* * * * *

UNITED STATES PATENT AND TRADEMARK OFFICE
CERTIFICATE OF CORRECTION

PATENT NO.   : 5,812,544
DATED        : Sep. 22, 1998
INVENTOR(S)  : Dent

It is certified that error appears in the above-identified patent and that said Letters Patent is hereby corrected as shown below:

Column 6, line 5   After "range"
Insert --;
wherein said first frame period comprises eight time slots denoted by at least one of the following frame patterns RIITISII, RITIISII, RITISIII, RIITIISI, and RITIIISI and said second frame period comprises six time slots denoted by at least one of the following frame patterns RIITII, RITIII, RIIITI, wherein R denotes receive, I denotes idle, T denotes transmit, and S denotes scanning an alternate frequency channel--

Signed and Sealed this

Twenty-seventh Day of July, 1999

Attest:

Q. TODD DICKINSON

*Attesting Officer*   *Acting Commissioner of Patents and Trademarks*